(12) United States Patent
Tilvis et al.

(10) Patent No.: US 9,172,437 B2
(45) Date of Patent: Oct. 27, 2015

(54) WIRELESS POWER TRANSFER DEVICE THAT REDIRECTS A MAGNETIC FLUX

(75) Inventors: Marko Tilvis, Oulunsalo (FI); Seppo Korkala, Kempele (FI)

(73) Assignee: Polar Electro Oy, Kempele (FI)

( * ) Notice: Subject to any disclaimer, the term of this patent is extended or adjusted under 35 U.S.C. 154(b) by 441 days.

(21) Appl. No.: 13/643,890

(22) PCT Filed: May 3, 2011

(86) PCT No.: PCT/FI2011/050402
§ 371 (c)(1),
(2), (4) Date: Nov. 26, 2012

(87) PCT Pub. No.: WO2011/138507
PCT Pub. Date: Nov. 10, 2011

(65) Prior Publication Data
US 2013/0063084 A1    Mar. 14, 2013

(30) Foreign Application Priority Data
May 7, 2010  (FI) .................................... 20105493

(51) Int. Cl.
*H01M 10/46* (2006.01)
*H04B 5/00* (2006.01)
*H01F 27/28* (2006.01)
*H02J 7/02* (2006.01)
*H01F 38/14* (2006.01)

(52) U.S. Cl.
CPC .............. *H04B 5/0037* (2013.01); *H01F 27/28* (2013.01); *H02J 7/025* (2013.01); *H01F 38/14* (2013.01); *H04B 5/0081* (2013.01)

(58) Field of Classification Search
CPC .......... H02J 5/005; H02J 7/0042; H02J 7/025
USPC .................................. 320/107, 108, 114, 115
See application file for complete search history.

(56) References Cited

U.S. PATENT DOCUMENTS

| 5,070,293 | A | * | 12/1991 | Ishii et al. ..................... 320/108 |
| 2005/0156560 | A1 | | 7/2005 | Shimaoka et al. |
| 2012/0169278 | A1 | * | 7/2012 | Choi et al. ..................... 320/108 |

FOREIGN PATENT DOCUMENTS

| JP | 2002051474 A | 2/2002 |
| WO | WO2004073283 A2 | 8/2004 |
| WO | WO 2009037380 A1 | 3/2009 |

OTHER PUBLICATIONS

Harri Maki-Mantila, International Search Report for corresponding PCT Int'l Appl. No. PCT/FI2011/050402, pp. 1-5, Apr. 18, 2012.
Search Report Issued in Corresponding Finnish Application 2010-5493 Nov. 22, 2010.

* cited by examiner

*Primary Examiner* — Edward Tso
(74) *Attorney, Agent, or Firm* — Hoffmann & Baron, LLP

(57) ABSTRACT

There is provided a wireless power transfer device comprising an input interface configured to receive a primary magnetic flux in a first direction, an output interface configured to output a secondary magnetic flux in a second direction different from the first direction, wherein the input interface and the output interface form a closed electric circuit.

20 Claims, 4 Drawing Sheets

WIRELESS POWER TRANSFER DEVICE THAT REDIRECTS A MAGNETIC FLUX

CROSS-REFERENCE TO RELATED APPLICATIONS

This application is a National Stage application of International Application No. PCT/FI2011/050402, filed May 3, 2011, which claims benefit to Finnish Application No. 20105493, filed May 7, 2010, which are incorporated by reference herein in their entirety.

BACKGROUND

1. Field

The invention relates generally to wireless power transfer. More particularly, the invention relates to redirecting a magnetic flux by a wireless power transfer device.

2. Description of the Related Art

It is known to charge a certain type of devices, such as toothbrushes, wirelessly over a magnetic connection. That is, by using a magnetic flux originating from a charger and penetrating into the device being charged, for example.

However, this type of charging involves several problems. These relate, for example, to the physical limitations of the devices, orientation of the devices, and efficiency of the charging process.

SUMMARY

Embodiments of the invention seek to improve the applicability of wireless charging.

According to an aspect of the invention, there are provided apparatuses as disclosed herein.

According to an aspect of the invention, there is provided a system as disclosed herein.

BRIEF DESCRIPTION OF THE DRAWINGS

In the following, the invention will be described in greater detail with reference to the embodiments and the accompanying drawings, in which.

DETAILED DESCRIPTION

Figure 1:
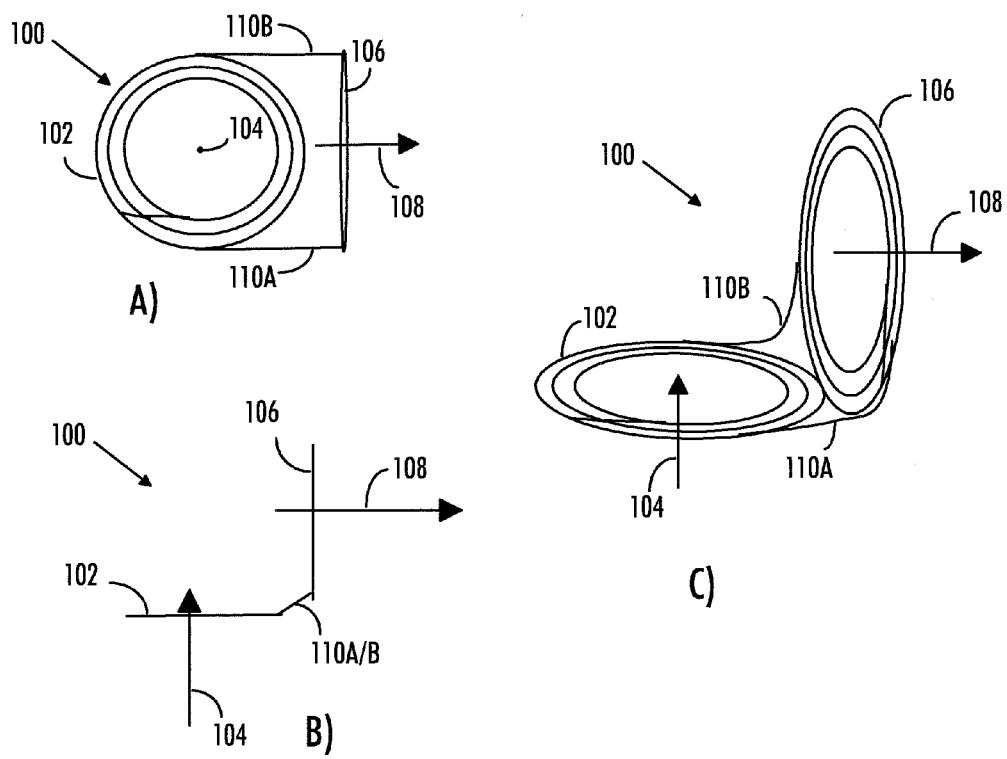
FIGS. 1A, 1B and 1C present a wireless power transfer device according to an embodiment.

The following embodiments are exemplary. Although the specification may refer to "an", "one", or "some" embodiment(s) in several locations of the text, this does not necessarily mean that each reference is made to the same embodiment(s), or that a particular feature only applies to a single embodiment.

According to electromagnetic induction theory, an alternating external magnetic flux induces a voltage to a conductor, such as to a coil. The voltage induced to the coil is given by $e=-NAdB/dt$, where B is the density of the magnetic field, A is the surface area of the coil, and N is the number of loops in the coil. The minus sign denotes that the polarity of the induced voltage e is such that it drives such an electric current to the coil that a magnetic field generated by the electric current opposes the change in the magnetic flux which produced the voltage e. Therefore, the induced electric current may generate another magnetic field that is oriented in the direction of the normal of the coil surface.

The induction phenomenon may be used in wireless charging of an external device, for example, by directing a magnetic flux of the magnetic field to the external target device being charged. Accordingly, generic inductive-based recharging devices are available, which can be used for recharging electric devices. Typically in inductive charging, the magnetic flux is generated by supplying electric current to a coil. The alternating electric current in the coil generates the magnetic field causing the magnetic flux. The reception of the magnetic flux enables an electric current to be generated to a coil of the external device.

One of the requirements for a successful charging is that the provider of the magnetic flux and the external device are inductively connected to each other. That is to say that the magnetic flux at least partly penetrates the coil of the external device. Optimal charging takes place when the direction of the magnetic flux is parallel with the normal of the coil plane of the external device, and the magnetic flux goes through the coil. This is because then the magnetic flux takes a quantity of BA, where B is the density of the magnetic field and A is the surface area of the coil. As a consequence, devices to be used for such recharging typically have a planar shape, and they can be placed on a table, for example. This often enables the magnetic coil of the charger and the external target device to be co-planar and to be placed on top of each other in a repeatable manner. Such devices are mobile phones, music players, and game controllers, for example. More particularly, such devices have a shape which encourages the user to place the device onto the charger in the most suitable position in terms of the charging efficiency.

However, it often occurs that the coil of the device to be charged deviates from the co-planar orientation with the coil of the charger, in which case the quantity of the magnetic flux is proportional to $\cos(\alpha)$, where α denotes the angle of the magnetic flux with respect to the normal of the surface of the coil. This leads to non-optimal or even impossible charging of the external device. This is especially the case with wrist devices because their structure is not beneficial to such wireless recharging.

A wrist device is a device which typically comprises a wrist band which can be attached to the user's wrist.

In an embodiment of the invention, the wrist device is a watch.

In an embodiment, the wrist device is a performance monitor capable of recording a performance data which characterize user's performance. Such performance data comprise cardiovascular data, such as heart rate, heart beat intervals, electrocardiographic data or heart rate variation data. In an embodiment, the performance data comprises motion data, such as acceleration data, speed data or location data, characterizing user's motion or instantaneous location.

In an embodiment of the invention, the wrist device is a wrist mobile phone.

Wrist devices seldom have planar structures which would enable a proper recharging position. The usual planar structures in wrist devices are a glass or a plastic shield in front of a display, and a back plate. Wrist devices are often treated as watches, which are considered to be fragile and prone to scratches. Therefore, users are hesitant to place the wrist device face (such as the display) down on a recharging device. On the other hand, a wrist strap often prevents the wrist device from being positioned face up on the charger. Therefore, the wrist devices may be put on the charger sidewise such that a side of the wrist watch including the wrist straps lies against the charger. However, a straightforward place for positioning the coil in the wrist watch is between the display and the back plate. This causes non-optimal charging due to the orientation of the magnetic flux with respect to the coil of the wrist device. In the worst case, the coil of the wrist device is perpendicular to the coil of the charger.

As a solution, a wireless power transfer device 100 is provided as shown in FIGS. 1A, 1B and 1C according to an embodiment. FIG. 1A shows a top view of the device 100, FIG. 1B presents a side view of the device 100, and FIG. 1C is a diagonal view of the device 100. The wireless power transfer device 100 may comprise an input interface 102 for receiving a first magnetic flux 104 in a first direction. The wireless power transfer device 100 may further comprise an output interface 106 configured to output a second magnetic flux 108 in a second direction different from the first direction. According to an embodiment, the input interface 102 and the output interface 106 form a closed electric circuit. Accordingly, the wireless power transfer device 100 may be a passive device. In other words, the input interface 102 and the output interface 106 are connected together via galvanic links 110A and 110B. The links 110A and 110B may be wires conducting an electric current between the input interface 102 and the output interface 106. As shown, the second magnetic flux 108 is directed to the normal of the surface of the output interface 106 providing the secondary magnetic flux 108.

Figure 2:
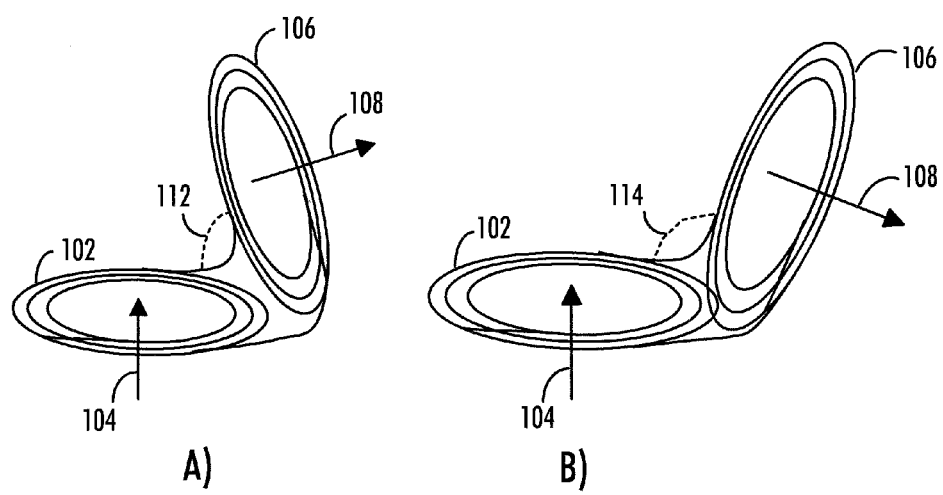
FIGS. 2A and 2B show a wireless power transfer device according to some embodiments.

In an embodiment, the first and the second directions are perpendicular to each other, as FIGS. 1A, 1B and 1C show. This means that the planes of the input interface 102 and the output interface 106 are perpendicular to each other. However, the first and the second directions may not be perpendicular to each other. FIGS. 2A and 2B show two cases where the directions of the magnetic fluxes 104/108 are different from each other but not perpendicular. FIGS. 2A and 2B show angles 112 and 114, respectively, between the planes of the input 102 and the output 106 interfaces. Accordingly, the angle may be smaller than 90 degrees, as is the case in FIG. 2A, or larger than 90 degrees, as is the case in FIG. 2B. Redirecting the direction of the magnetic flux enables a variety of different physical structures to be placed in connection with the wireless power transfer device 100.

Figure 3:
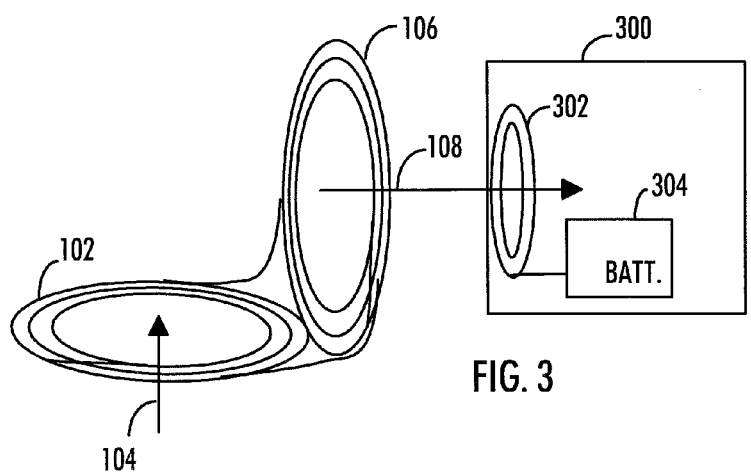
FIG. 3 shows an external device being charged according to an embodiment.
Figure 4:
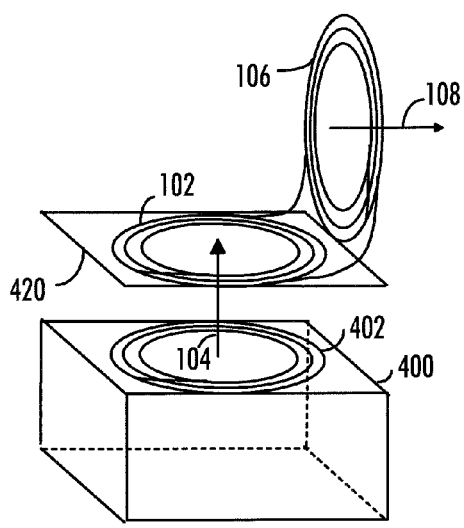
FIG. 4 illustrates a support structure of the wireless power transfer device according to an embodiment.

FIG. 3 shows a possible use of the second magnetic flux 108 according to an embodiment. In FIG. 3, the output interface 106 charges an external device 300 with the second magnetic flux 108. The external device 300 may comprise an interface 302 such as a magnetic coil for receiving the second magnetic flux 108. The second magnetic flux 108 may induce an electric current to the coil 302 which electric current is used to charge a battery 304 of the external device 300.

According to an embodiment, the wireless power transfer device 100 further comprises a supporting structure 420 for supporting the wireless power transfer device 100 with respect to an external device 400 providing the primary magnetic flux 104. The supporting structure 420 may be integrated into a casing of the wireless power transfer device 100, in which case the supporting structure 420 may form the bottom side of the casing. The supporting structure 420 may be placed on the top of the external device 400 comprising a coil 402. The external device 400 may be of a planar shape so that the coil 402 is placed in the same plane inside the external device 400. The external device 400 providing the first magnetic flux 104 may be a flat structure, such as a mat or the like, comprising the coil and a power intake, possibly a wired power intake. The power taken in causes an electric current to flow in the coil 402, which causes the first magnetic flux 104 to emerge.

Alternatively, no external device 400 providing the first magnetic flux 104 is necessary when the wireless power transfer device 100 includes a power intake in a form of a wire. The power can then be used in generating the electric current in the output interface 106. Hence, in this case no need for the input interface 102 is necessary.

According to an embodiment, the input interface 102 comprises a first coil, and the output interface 106 comprises a second coil, wherein the first coil is oriented with respect to the supporting structure 420 so as to receive the first magnetic flux 104. By applying an appropriate supporting structure with respect to the plane of the coil 402 of the external device 400, efficient charging may be obtained due to the beneficial orientation of the first magnetic flux 104 with respect to the first coil. Gravitation may keep the wireless power device 100 against the external device 400. Alternatively, attachment means, such as clips, may be provided for attaching the supporting structure 420 (or the casing) to the external device 400.

The first and second coils may have a ferrite core or an air core. The coils may be implemented with wires or based on printed boards. The first and second coils of the wireless power transfer device 100 may be of different sizes, or their surface area may be the same. The number of loops in each coil may vary as well. The coil material is electrically conductive material, such as copper or aluminum.

In addition to the direction of the magnetic flux with respect to the receiving coil, the recharging efficiency is proportional to the area A of the coil. In practice this means that the coil in the target device to be charged is beneficially positioned in a dimension which allows large coil areas. According to an embodiment, the first coil of the wireless power transfer device 100 has a large surface area $A_1$ so that it can efficiently receive the energy carried in the first magnetic flux 104. The received energy can then be transferred to the external device 300 to be charged via the second coil. This enables efficient gathering of the energy with the large coil surface area $A_1$ and the output of the energy to the external device 300 with the second coil that may be designed to match the coil of the external device 300 being charged.

In an embodiment of the invention, the inductance of the input interface 102 matches the inductance of the external device 400. A matching may be implemented by choosing the area of a first coil and/or the number of loops so that appropriate mutual inductance between the first coil and the recharging circuitry of the external device 400 is obtained.

In an embodiment of the invention, the inductance of the output interface 106 matches the inductance of the recharging circuit of the wrist device. A matching may be implemented by choosing the area of a second coil and/or the number of loops so that appropriate mutual inductance is obtained between the second coil and the recharging circuitry of the wrist device.

Figure 5:
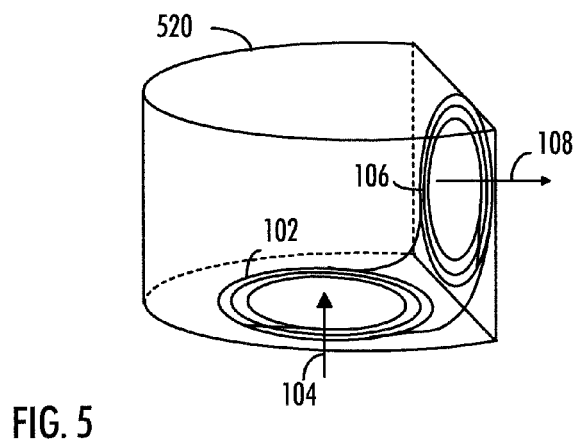
FIG. 5 illustrates a casing of the wireless power transfer device according to an embodiment.
Figure 6:
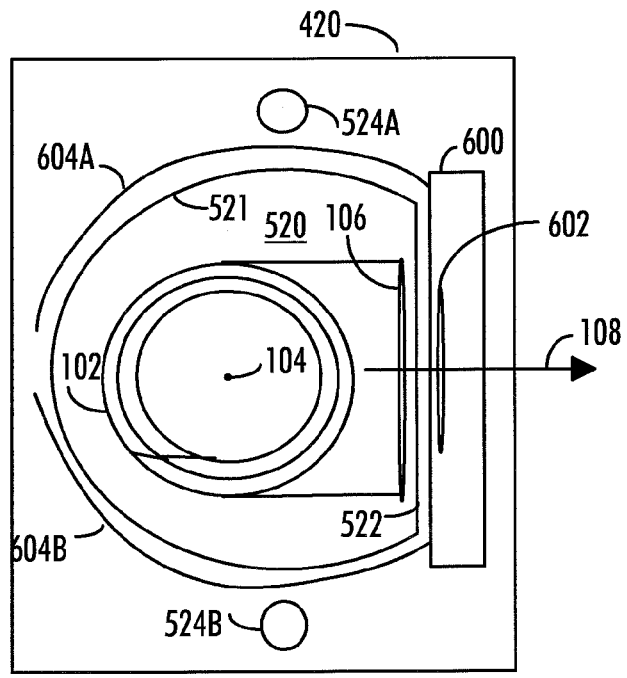
FIG. 6 presents a wrist device adapted around the casing of the wireless power transfer device according to an embodiment.

According to an embodiment, the wireless power transfer device 100 may further comprise a casing 520 supporting the input interface 102 and the output interface 106 as shown in FIGS. 5 and 6. The casing 520 may have a variety of physical structures. It also functions as a shield for the interfaces 102 and 106. Furthermore, the casing 520 functions as a contact surface for or a receiver of the external device 300 of FIG. 3. Accordingly, the physical structure of the casing 520 may be selected according to the physical structure of the external device 300 to be associated with the wireless power transfer device 100. In one embodiment, the casing 520 is a rectangular box. The material for the casing may be plastic, for example.

According to an embodiment, the casing 520 receives a wrist device 600 and the output interface 106 is directed with respect to the casing 520 so as to direct the second magnetic flux 108 to a target area of the wrist device 600, as shown in FIG. 6 which is a top view. The target area of the wrist device may be the area where the coil 602 of the wrist device 600 is located. To further aid the reception of the wrist device 600 on the casing 520, the casing 520 may comprise a receiving surface 522 for receiving the backside of the wrist device 600. The receiving surface may be a vertical flat surface, for example, so that the wrist device 100 may be put on the wireless power transfer device 100 sidewise. By sidewise it is meant that one side of the wrist device 600 along with the wrist straps 604A and 604B rests on the casing, as shown in FIG. 6.

According to an embodiment, the casing 520 further comprises support members 524A and 524B for supporting the wrist straps 604A and 604B of the wrist device 600. The wrist straps 604A and 604B may be put between a main body 521 of the casing 520 and the support members 524A and 524B. The support members 524A and 524B may be vertically extending elements preventing the wrist straps 604A and 604B, respectively, from moving significantly with respect to the wireless power transfer device 100. Similarly, the main body 521 of the casing 520 may be a vertically extending element allowing the wrist straps 604A and 604B to surround the main body 521 of the casing 520. Therefore, the main body 521 of the casing 520 may have an at least partly circular shape, although it may also have the flat surface 522 for receiving the back plate of the wrist device 600.

In an embodiment, the coil of the wrist device 600 is integrated into the wrist straps 604A and 604B in which case no wireless power transfer device 100 is needed. When the wrist device 600 is placed sidewise, the coil of the wrist device 600 is co-planar with the planar-shaped external device 400 providing the primary magnetic flux 104. This way the magnetic flux is efficiently captured by the coil in the wrist straps 604A and 604B.

According to an embodiment, instead of being a passive device comprising the coil circuitry of the first and the second coils connected together to form the closed electric circuit, the wireless power transfer device 100 may further comprise a circuitry 700 for transferring data over the output interface 108. That is to say that the wireless power transfer device 100 may communicate with the external device 300/600 receiving the second magnetic flux 108. This enables the wireless power transfer device 100 to transmit data to the external device 300/600, or the wireless power transfer device 100 to receive data from the external device 300/600. The data may include instructions being given to the external device 300/600 regarding the operation of the external device 300/600.

According to an embodiment, the wireless power transfer device 100 may further comprise a communication interface 702 for accessing a network 704 in order to communicate data with the network 704. The transfer of data to the network 704 over the communication interface 702 may take place wirelessly or via a wire. The communication interface 702 may operate under a Wireless Local Area Network (WLAN), a BlueTooth, a BlueTooth Low Energy, a ZigBee, or an ANT, for example, for communicating with a wireless network or a computer. In order to transmit the data to the network 704 wirelessly, the wireless power transfer device 100 may comprise at least one antenna.

This is beneficial so that if there is data stored in the external device 300/600 that needs to be transferred to the network 704, the data may be first transferred to the wireless power transfer device 100 over the magnetic fields and then over the communication interface 702 to the network 704. This way, the external device 300/600 may perform the data transfer while the external device 300/600 is being charged so that the user may not need to transfer the data separately via the computer, for example.

An exemplary case where data may need to be transferred is when the external device 300/600 is a performance monitor or a personal exercise computer, for example, and the performance monitor has exercise information stored in its memory. Typically, a user would transfer the exercise data to a separate computer and analyze the exercise by using the separate computer. According to the embodiment, the user need not do this transfer separately, because the wireless power transfer device 100 performs the transfer automatically while the performance monitor is being recharged. One exemplary scenario is that the user puts the performance monitor on charge for the night time and the data stored in the performance monitor is transferred via the output interface 106 and the communication interface 702 to the network 704 which the separate computer is either connected to or connectable to.

The data transfer embodiment allows for a higher power consumption of the external device 300/600 when transferring data, because the data transfer takes place when the external device 300/600 is being charged by the wireless power transfer device 100. The embodiment further allows for freedom in the implementation of the external device 300/600, because no need may exist to implement any wireless communication interface operating under WLAN, for example. This allows for a thinner physical structure of the external device 300/600.

Figure 7:
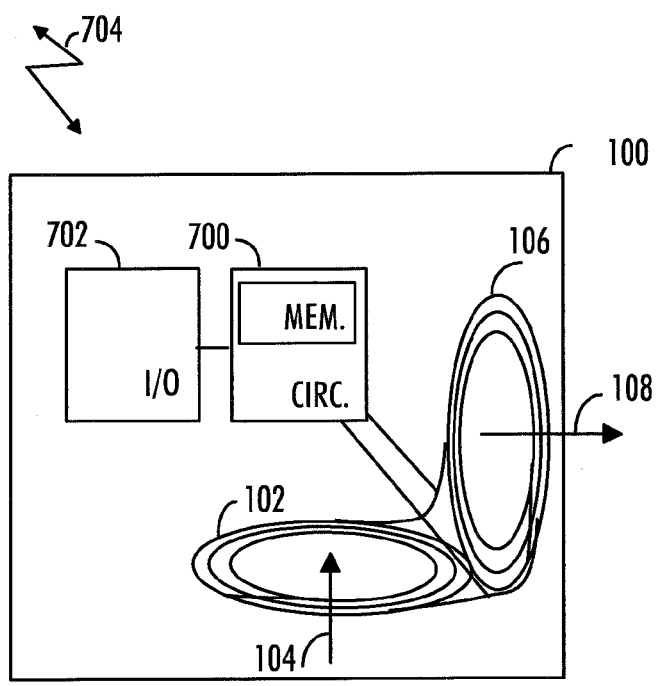
FIG. 7 presents a wireless power transfer device according to an embodiment.

The circuitry 700 and the communication interface 704 may be powered by the coil circuitry comprising the first and the second coils connected together as the closed electric circuit, as shown in FIG. 7.

The wireless power transfer device 100 may further comprise a memory connected to the circuitry 700. However, memory may also be integrated in to the circuitry 700 and, thus, no separate memory may be required. The memory may store the data to be communicated with or received from the external device 300/600 and/or the network 704.

Figure 8:
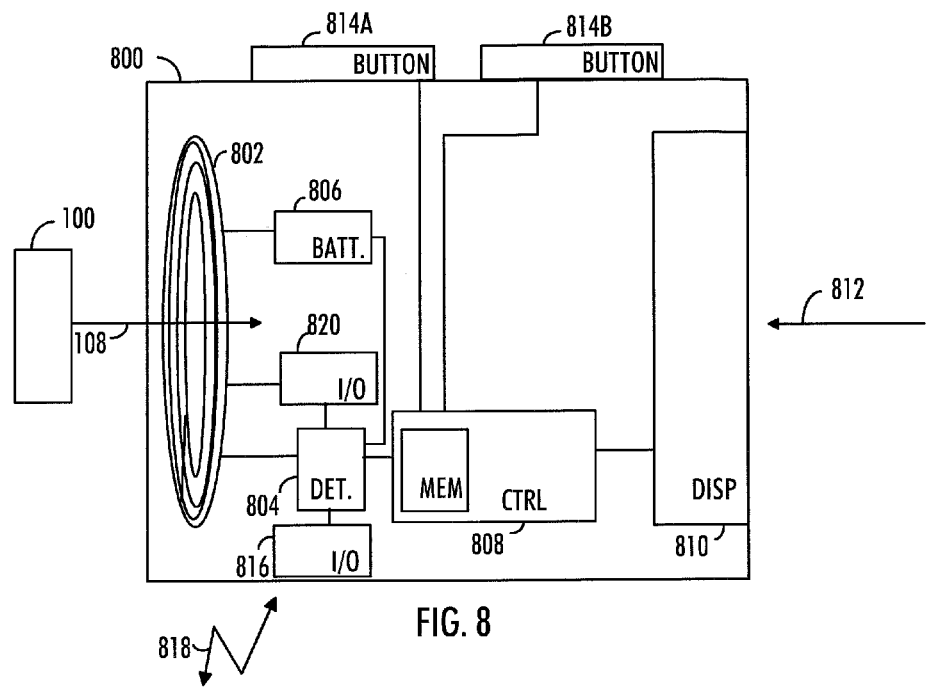
FIG. 8 illustrates a wrist device according to an embodiment.

There is also provided a wrist device 800. A very general architecture of the wrist device according to an embodiment is shown in FIG. 8. FIG. 8 shows only the elements and functional entities required for understanding the wrist device 800 according to an embodiment. Other components have been omitted for reasons of simplicity. The implementation of the elements and functional entities may vary from that shown in FIG. 8. The connections shown in FIG. 8 are logical connections, and the actual physical connections may be different. The connections can be direct or indirect and there can merely be a functional relationship between components. It is apparent to a person skilled in the art that the wrist device 800 may also comprise other functions and structures.

The wrist device may be associated with the wireless power transfer device 100 so that a coil 802 of the wrist device 800 may receive the second magnetic flux 108 from the output interface of the wireless power transfer device 100. In order to receive the magnetic flux efficiently, the wireless power transfer device 100 may comprise the casing 520 for receiving the wrist device 800 so that the wrist device 800 may be put optimally with respect to the second coil (acting as the output interface 106) of the wireless power transfer device 100. Then the coil 802 and the second coil of the wireless power transfer device 100 may be co-planar or at least close to co-planar.

The wrist device 800 may further comprise a user interface 810. The user interface may comprise a display for showing information, an acoustic speaker for producing sounds, touch sensors for sensing a touch of a user, a motion sensor for sensing the motion of the wrist device 800, for example.

The wrist device 800 may further comprise a detection circuitry 804 for detecting the presence of the secondary magnetic flux 108. The detection of the secondary magnetic flux 108 may take place such that the detection circuitry 804 detects an emerging current in the coil 802 or a battery 806 being charged, for example.

The wrist device 800 may further comprise a user interface controller 808 for setting the user interface into a recharging mode when the second magnetic flux 108 has been detected. In other words, the wrist device 800 has certain functionalities while the wrist device 800 is being recharged by the power transfer device 100. These functionalities may be different from the functionalities of a normal, non-recharging, mode. In order to obtain knowledge regarding the detection of the second magnetic flux, the detection circuitry 804 is connected to the user interface controller 808. The use of a different operation mode of the wrist device 800 when connected to the wireless power transfer device 100 is beneficial so that the wrist device may automatically perform certain actions without any user input. The wrist device 800 may comprise a memory connected to the controller 808. However, memory may also be integrated to the controller 808 and, thus, no separate memory may be required. The memory may be used to store information or different configurations related to the recharging mode, for example. The functionalities of the recharging mode may be preconfigured in the wrist device 800.

When the user interface comprises a display 810, the recharging mode may include at least one of the following processes: illuminating the display and rotating the view on the display. The user interface controller 808 may perform the illumination of the display by switching the illumination of the display on. The light may be provided by separate light sources, such as light emitting diodes (LEDs). There may also be an optical fiber guiding the light to the display. The illumination is beneficial when a user wishes to use the wrist device 800 as a night watch. Then the user may put the wrist device 800 on the casing of the wireless power transfer device 100. The user interface controller 808 may, after being notified by the detection circuitry 804, turn on the recharging mode according to which the display is lit.

The rotation of the view of the display may be such that the view is rotated 90 degrees. This is beneficial so that the user looking at the device 800 from a viewing direction 812 need not turn his/her head when reading the information on the display. Instead the information, such as time, date and/or a picture, on the display is rotated to an upright position so that the view is readable when the wrist unit is tilted. Imagine that a user sets the wrist watch 800 on the wireless power transfer device 100 as shown in FIG. 6. Then the orientation of the information on the display is not upright but horizontal. As a consequence, the user is not able to read the information on the display as easily as he/she desires. Rotating the view 90 degrees when the user interface controller 808 is notified by the detection circuitry 804 changes the orientation of the information to an upright (vertical) orientation so that the information being displayed may be easily read by the user.

Figures 9A, 9B:
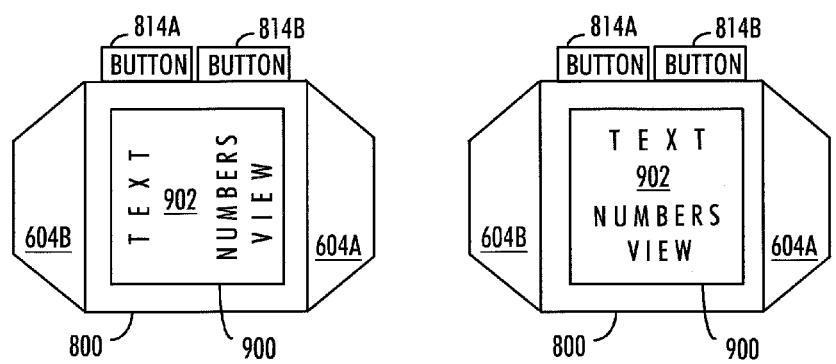
FIGS. 9A and 9B illustrate rotation of a display.

The rotation of the display is shown in FIGS. 9A and 9B. FIG. 9A shows the wrist device 800 equipped with the wrist straps 604A and 604B, one or more buttons 814A and 814B, and a display 900 for showing information 902. The information 902 may be text strings, numeric values or pictures, for example. Same elements are shown in FIG. 9B. However, in FIG. 9A the wrist device 800 is not in the recharging mode and therefore the information 902 shown in the display 900 is not upright. This makes the information difficult to read when the wrist device 800 is placed tilted on a table, for instance. In FIG. 9B, the wrist device is in the recharging mode, which causes the information 902 in the display 900 to be rotated 90 degrees so that the information 902 in the display 900 is easily read when the wrist device 800 is tilted.

The user interface 810 may comprise an input interface 814, such as at least one button 814A and 814B. The user interface controller 808 switches on the recharging mode when the user interface controller 808 is notified of the presence of the second magnetic flux 108. According to an embodiment, the recharging mode includes a process of reconfiguring the input interface 814. The process of reconfiguring the input interface 814 may include reconfiguring the functions performed by the at least one button 814A and 814B. For example, when the wrist device 800 is placed sidewise as shown in FIG. 6, the buttons pointing upwards may have a certain functionality different from the normal functionality. They may be configured to stop an alarm sound, activate an alarm clock functionality, or to initiate or cancel data transfer, for example. When no presence of the secondary magnetic flux 108 is detected any longer, the configuration of the input interface 814 is restored to its normal, original state, for example. The input interface 814 may also comprise microphones for receiving acoustic instructions. These may also be reconfigured such that when the user gives an order "stop", the alarm clock goes silent, for example.

According to an embodiment, the wrist device 800 further comprises a communication interface 816 for communicating data with a network 818. The detection circuitry 804 may initiate the process of communicating data automatically over the communication interface 816 to the network 818. This is beneficial so that the data being stored in the wrist device 800 may be transmitted automatically to the network 818 and possibly to a computer connected to the network 818 without specific orders from the user. The user only needs to place the wrist watch 800 on the wireless power transfer device 100. Thus, at the same time as the wrist watch 800 is being charged, it can transmit data to the network 800. Alternatively, the communication interface 816 may receive data from the network 818. The data may be related to a software update of the wrist device 800, for example. The communication interface may operate under WLAN, BlueTooth, BlueTooth Low Energy, or proprietary data transfer protocol or wireless data transfer technique. In order to transmit the data to the network 818 wirelessly, the wrist device 800 may comprise at least one antenna.

According to an embodiment, the wrist device 800 may further comprise an interface 820 for exchanging data with the wireless power transfer device 100 over the coil 802 and the output interface 108 of the wireless power transfer device 100. The detection circuitry 804 may initiate the data transfer over the interface 820 when the second magnetic flux 108 has been detected. This is advantageous so that the data being stored in the wrist device 800 may be transmitted automatically to the wireless power transfer device 100 and possibly further to the network 704 as shown in FIG. 7.

As used in this application, the term 'circuitry' refers to all of the following: (a) hardware-only circuit implementations, such as implementations in only an analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The techniques and methods described herein may be implemented by various means. For example, these techniques may be implemented in hardware (one or more devices), firmware (one or more devices), software (one or more modules), or combinations thereof. For a hardware implementation, the devices 100 and/or 800 may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Certain embodiments may be implemented as computer programs in the wrist device 800 or in the wireless power transfer device 100 according to the embodiments. The computer programs comprise instructions for executing a computer process. The computer program implemented in the wireless power transfer device 100 may carry out, but is not limited to, the tasks related to FIG. 7. The computer program implemented in the wrist device 800 may carry out, but is not limited to, the tasks related to FIG. 8.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but can be modified in several ways within the scope of the appended claims. Further, it is clear to a person skilled in the art that the described embodiments may, but are not required to, be combined with other embodiments in various ways.

The invention claimed is:

1. A wireless power transfer device comprising:
an input interface that receives a first magnetic flux in a first direction, the input interface comprising a first coil receiving the first magnetic flux; and
an output interface that outputs a second magnetic flux in a second direction different from the first direction, the output interface comprising a second coil outputting the second magnetic flux, the input interface and the output interface being connected together by at least one galvanic link to form a closed electric circuit.

2. The wireless power transfer device of claim 1, wherein the output interface is configured to charge an external device with the second magnetic flux.

3. The wireless power transfer device of claim 1, further comprising a supporting structure for supporting the wireless power transfer device with respect to an external device providing the first magnetic flux, the first coil being oriented with respect to the supporting structure so as to receive the first magnetic flux.

4. The wireless power transfer device of claim 1, wherein the wireless power transfer device further comprises a casing supporting the input interface and the output interface, the casing being configured to receive a wrist device, the output interface being directed with respect to the casing so as to direct the second magnetic flux to a target area of the wrist device.

5. The wireless power transfer device of claim 4, wherein the casing further comprises:
a receiving surface for receiving a backside of the wrist device; and
support members for supporting wrist straps of the wrist device.

6. The wireless power transfer device of claim 1, further comprising a circuitry configured to transfer data over the output interface.

7. The wireless power transfer device of claim 6, further comprising a communication interface for accessing a network in order to communicate data with the network.

8. A wrist device, comprising:
a user interface;
a coil configured to receive a second magnetic flux from a wireless power transfer device;
a detection circuitry for detecting the presence of the second magnetic flux; and
a user interface controller for setting the user interface into a recharging mode when the second magnetic flux has been detected.

9. The wrist device of claim 8, wherein the user interface comprises a display, the recharging mode comprising at least one of the following processes: illuminating a display and rotating a view on the display.

10. The wrist device of claim 8, wherein the user interface comprises an input interface, the recharging mode comprising a process of reconfiguring the input interface.

11. The wrist device of claim 8, wherein the wrist device further comprises a communication interface configured to communicate data with a network, the detection circuitry being further configured to initiate data transfer over the communication interface when the second magnetic flux has been detected.

12. The wrist device of any of claim 8, wherein the wrist device further comprises an interface configured to exchange data with the wireless power transfer device over the coil and an output interface of the wireless power transfer device, the detection circuitry being further configured to initiate data transfer over the interface when the second magnetic flux has been detected.

13. A system comprising:
a wireless power transfer device, the wireless power transfer device comprising:
an input interface configured to receive a first magnetic flux in a first direction;
an output interface configured to output a second magnetic flux in a second direction different from the first direction, the input interface and the output interface forming a closed electric circuit; and
a wrist device, the wrist device comprising:
a user interface;
a coil configured to receive the second magnetic flux from the wireless power transfer device;
a detection circuitry for detecting the presence of the second magnetic flux; and
a user interface controller for setting the user interface into a recharging mode when the second magnetic flux has been detected.

14. The system of claim 13, wherein the wireless power transfer device further comprises a supporting structure for supporting the wireless power transfer device with respect to an external device providing the first magnetic flux, the input interface comprising a first coil, the output interface comprising a second coil, the first coil being oriented with respect to the supporting structure so as to receive the first magnetic flux.

15. The system of claim 13, wherein the wireless power transfer device further comprises a casing supporting the input interface and the output interface, the casing being configured to receive the wrist device, the output interface being directed with respect to the casing so as to direct the second magnetic flux to a target area of the wrist device.

16. The system of claim 15, wherein the casing comprises:
a receiving surface for receiving a backside of the wrist device; and
support members for supporting wrist straps of the wrist device.

17. The system of claim 13, wherein the wireless power transfer device further comprises a circuitry configured to transfer data over the output interface, and the wrist device further comprise an interface configured to exchange data with the wireless power transfer device over the coil and output interface of the wireless power transfer device, the detection circuitry being further configured to initiate data transfer over the interface when the second magnetic flux has been detected.

18. The system of claim 17, wherein the wireless power transfer device further comprises a communication interface for accessing a network in order to communicate the data with the network.

19. The system of claim 13, wherein the user interface comprises a display, the recharging mode comprising at least one of the following processes: illuminating a display and rotating a view on the display.

20. The system of claim 13, wherein the user interface comprises an input interface, the recharging mode comprising a process of reconfiguring the input interface.

* * * * *